(12) United States Patent
Lai et al.

(10) Patent No.: US 7,210,044 B2
(45) Date of Patent: Apr. 24, 2007

(54) MOBILE PHONE WITH AN ENCRYPTION FUNCTION

(75) Inventors: Cheng-Shing Lai, Taipei Hsien (TW); Qing-Hua Li, Nanjing (CN); Xiao-Long Fan, Nanjing (CN)

(73) Assignee: Inventec Appliances Corp., Wugu Shiang, Taipei (TW)

( * ) Notice: Subject to any disclaimer, the term of this patent is extended or adjusted under 35 U.S.C. 154(b) by 839 days.

(21) Appl. No.: 10/249,058

(22) Filed: Mar. 13, 2003

(65) Prior Publication Data
US 2004/0180694 A1    Sep. 16, 2004

(51) Int. Cl.
*H04L 9/32* (2006.01)

(52) U.S. Cl. .................... 713/193; 726/26; 726/27; 726/28; 713/189

(58) Field of Classification Search ............... 713/193, 713/189; 726/26–28
See application file for complete search history.

(56) References Cited

U.S. PATENT DOCUMENTS 7,003,329 B1 * 2/2006 Kirkpatrick ............... 455/567
7,096,370 B1 * 8/2006 Klein ......................... 713/193

* cited by examiner

*Primary Examiner*—Kambiz Zand
*Assistant Examiner*—Jacob Lipman
(74) *Attorney, Agent, or Firm*—Winston Hsu

(57) ABSTRACT

A mobile phone has an encryption module, a decryption module, an antenna, a microphone, a speaker, a main memory, and a memory connector for connecting to an expansion memory. When the expansion memory connects to the memory connector to store a document received from the mobile phone, the encryption module first generates a crypto-key and then encrypts the document into a ciphered document by utilizing the crypto-key. The ciphered document is stored in the expansion memory, and crypto-key is restricted from being stored in the main memory.

8 Claims, 4 Drawing Sheets

MOBILE PHONE WITH AN ENCRYPTION FUNCTION

BACKGROUND OF INVENTION

1. Field of the Invention

The present invention relates to a mobile phone with an encryption function, and more particularly to a mobile phone capable of connecting to an expansion memory to store a ciphered document and restricting a crypto-key used for decrypting the ciphered document from being stored in the expansion memory.

2. Description of the Prior Art

Widely available mobile communications is one of the distinctive hallmarks of modern information-based society. In order to improve the functions of the mobile phones, expansion slots are designed for connecting the mobile phones to additional devices. For example, a user can purchase an MP3 (Moving Pictures Experts Group Layer III Audio) module to plug in his/her mobile phone to enjoy MP3 quality music.

Moreover, the expansion memory card, such as a secure digital card (SD card), multi media card, smart media card, or compact flash card, etc., is one of the widespreadusages of the expansion modules for data storage purpose. Users can first use the expansion memory cards to store files, such as electronic books and MP3 files, and then uses their mobile phones to read or listen the books or the music. However, because the prior art mobile phones are improperly designed to protect the data stored in these expansion memory cards, the data stored in these memory cards may be stolen when the memory cards are lost. Moreover, if the users store their secrets, such as bank accounts and passwords, in the memory cards, they may have huge economic loss when the data stored in the memory card is stolen.

Among the various memory cards, the secure digital card (SD card) is a memory card with an encryption and decryption function. The SD card uses a pair of crypto-keys to encrypt and decrypt data. However, because the pair of crypto-keys is stored in a hidden area of the SD card and the operations for encryption and decryption of the SD card are performed by internal circuits of the SD card, the data stored in the SD card is not safe from hackers when the SD card is lost.

SUMMARY OF INVENTION

It is therefore a primary objective of the claimed invention to provide a mobile phone capable of connecting an expansion memory to store a ciphered document and restricting a crypto-key for decrypting the ciphered document from being stored in the expansion memory.

The mobile phone comprises a control circuit for controlling operations of the mobile phone, an encryption module for encrypting data, a decryption module for decrypting data, an antenna electrically connected to the control circuit for receiving and generating radio signals, a microphone electrically connected to the control circuit for converting input voices into voice signals and transmitting the voice signals to the control circuit so that the control circuit controls the antenna to generate corresponding radio signals according to the voice signals, a speaker electrically connected to the control circuit for receiving voice signals from the control circuit and converting the received voice signals into output voices, a main memory electrically connected to the control circuit for storing data, and a memory connector electrically connected to the control circuit for connecting an expansion memory. When the expansion memory connects to the memory connector to store a document received from the mobile phone, the encryption module generates a crypto-key according to an identity of the mobile phone and encrypts the document into a ciphered document by utilizing the crypto-key, and then the ciphered document is stored in the expansion memory and the crypto-key is restricted from being stored in the expansion memory.

Because the mobile phone restricts the crypto-key from being stored in the expansion memory, even if the expansion memory is stolen, the data stored in the expansion memory cannot be successfully decrypted without the crypto-key. The data stored in the expansion memory, thus, is under a proper protection.

These and other objectives and advantages of the present invention will no doubt become obvious to those of ordinary skill in the art after reading the following detailed description of the preferred embodiment that is illustrated in the various figures and drawings.

DETAILED DESCRIPTION

Figure 1:
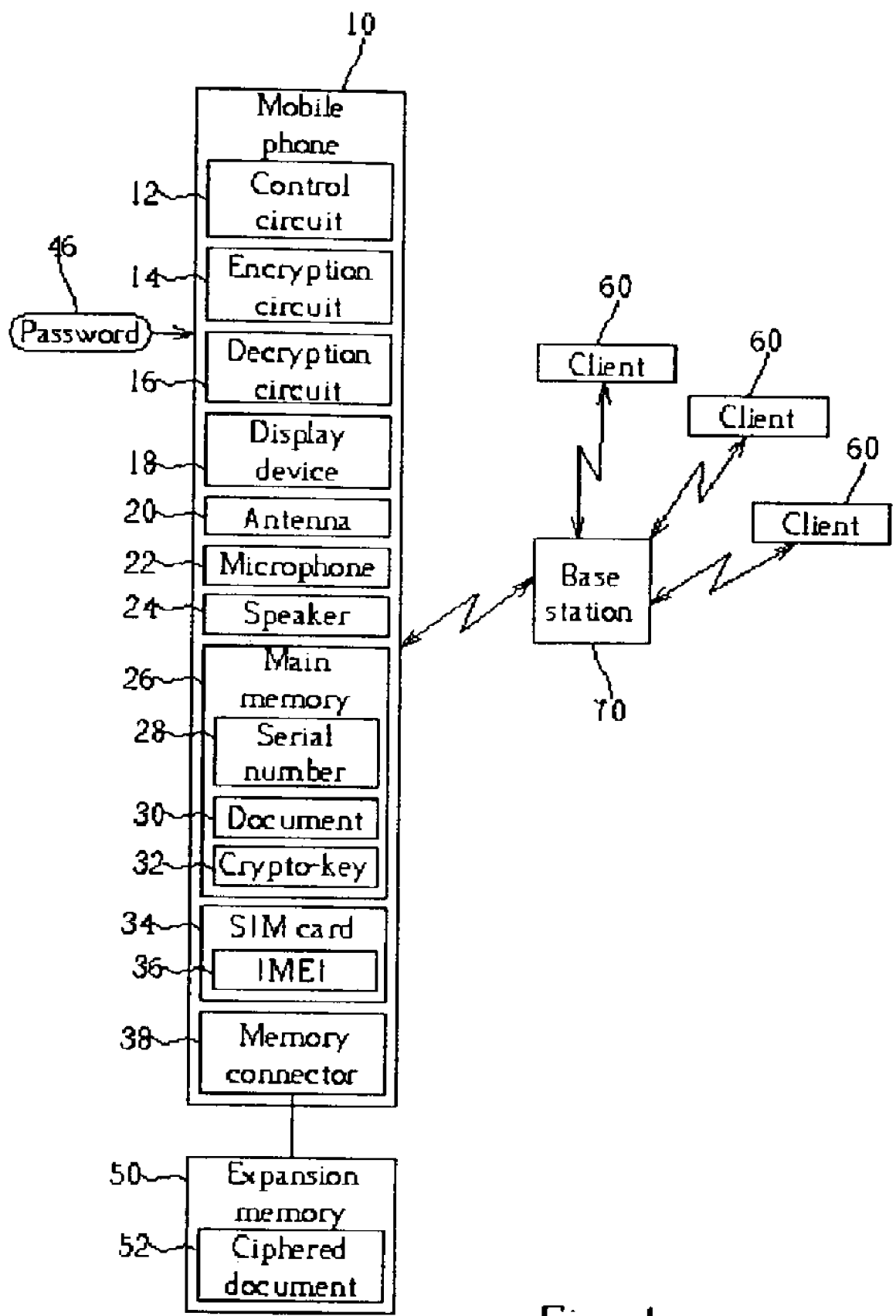
FIG. 1 is a functional block diagram of a base station, some user clients, and a mobile phone according to the present invention.
Figure 2:
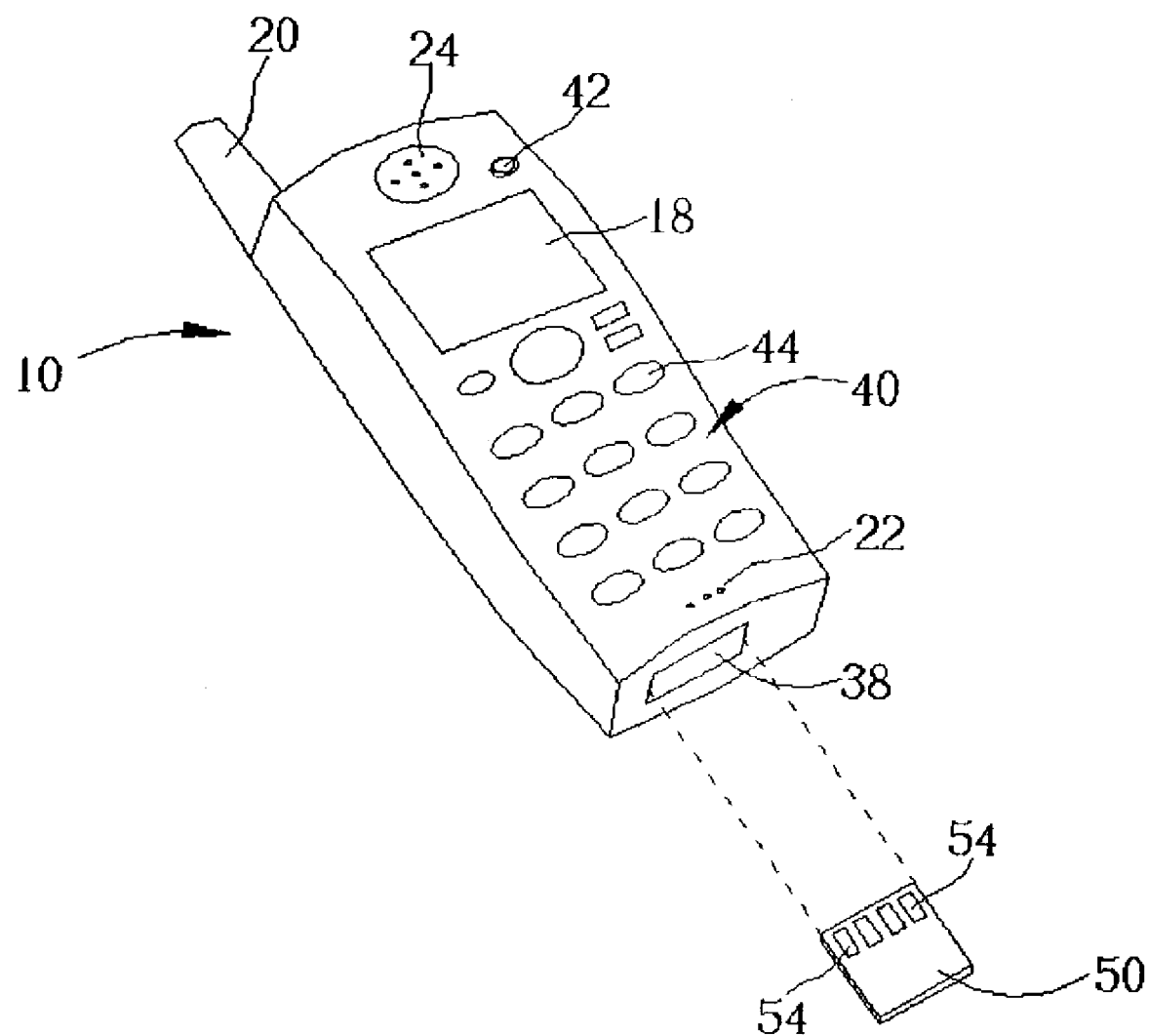
FIG. 2 is a perspective view of the mobile phone and an expansion memory shown in FIG. 1.

Please refer to FIG. 1 and FIG. 2. FIG. 1 is a functional block diagram of a base station 70, some user clients 60, and a mobile phone 10 according to the present invention. FIG. 2 is a perspective view of the mobile phone 10 and an expansion memory 50 shown in FIG. 1. The mobile phone 10, the user clients 60, and the base station 70 are located in a wireless communication system. The mobile phone 10 can wirelessly communicate with the user clients 60 via the base station 70. In this embodiment, the mobile phone 10 is a GSM (Global System for Mobile Communications) mobile phone, and comprises a control circuit 12, an encryption module 14, a decryption module 16, a display device 18, an antenna 20, a microphone 22, a speaker 24, a main memory 26, a SIM card (Subscriber Identity Module Card) 34, a memory connector 38, a housing 40, a switch 42, and a plurality of buttons 44. Most of the elements of the mobile phone 10 are installed inside the housing 40. The switch 42 is used to turn on/off the mobile phone 10, and the buttons 44 are used to generate signals and commands for the mobile phone 10. The control circuit 12 is used to control operations of the mobile phone 10, such as data processes, graphic display, and analog/digital conversion etc. The display device 18, the antenna 20, the microphone 22, the speaker 24, the main memory 26, and the memory connector 38 are electrically connected to the control circuit 12. The encryption module 14 is used to encrypt data, and the decryption module 16 is used to decrypt data. Both the encryption module 14 and the decryption module 16 can be embodied in circuit forms or software forms. The display device 18 is a liquid crystal display for displaying information, and the antenna 20 is controlled by the control circuit 12 for receiving and generating radio signals. The microphone 22 is used to convert input voices into voice signals and transmit the voice signals to the control circuit 12 so that the control circuit 12 controls the antenna 20 to generate corresponding radio signals according to the voice signals and transmit the radio signals to the base station 70. The speaker 24 is used to receive voice signals from the control circuit 12 and convert the received voice signals into output voices. The main memory 26 is composed of all the elements of the mobile phone 10 that are capable of storing data. The main memory 26 may comprise only non-volatile memories or volatile memories, but the main memory 26 may comprise both the non-volatile memories and the volatile memories. In the embodiment, the main memory 26 records a plurality of phone numbers, a serial number 28, and a document 30. The serial number 28 is burned in the main memory 26 according to a specific coding rule by the manufacturer during the manufacturing of the mobile phone 10, and the document 30 is received from a server. The SIM card 34 is used to record an identity of the mobile phone 10, such as the international mobile station equipment identity (IMEI) 36, so that the base station 70 is capable of distinguishing different users according to the IMEI 36 stored in the SIM card 34. The memory connector 38 is used to connect an expansion memory 50. The expansion memory 50 may be the multi media card, the smart media card, or the compact flash card. The expansion memory 50 comprises a plurality of connecting pins 54 for transmitting and receiving signals. When the expansion memory 50 is plugged into the memory connector 38, the control circuit 12 can use the expansion memory 50 to store data so that the total memory capacity of the mobile phone 10 is increased.

Figure 3:
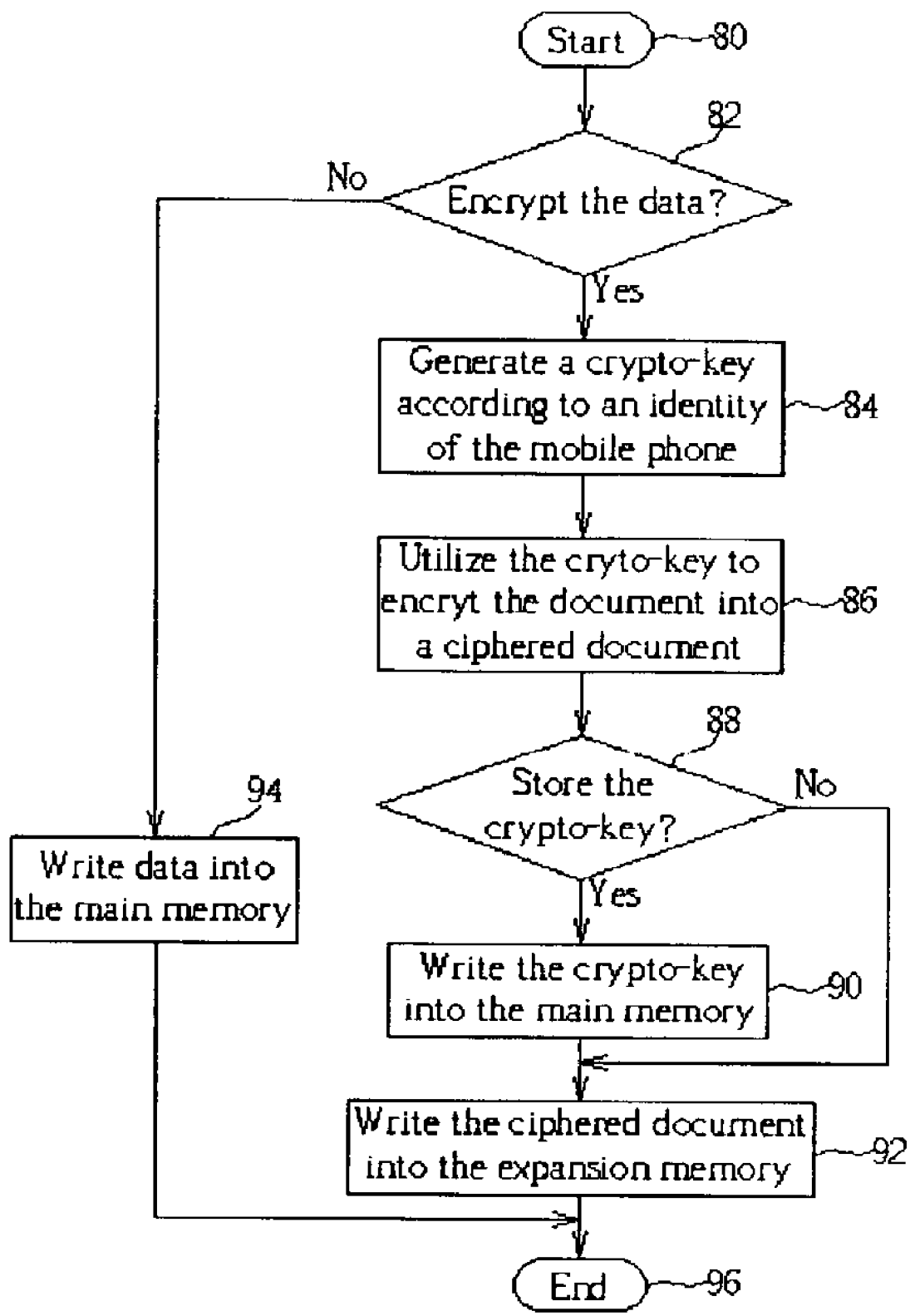
FIG. 3 is a flowchart of the mobile phone in FIG. 2 when storing data into the expansion memory in FIG. 2.

In order to protect the data stored in the expansion memory 50 from being stolen, the mobile phone 10 has an encryption and decryption function to utilize the encryption module 14 and the decryption module 16 to encrypt or decrypt data. Please refer to FIG. 3, which is a flowchart of the mobile phone 10 when storing data into the expansion memory 50. For example, when the mobile phone 10 stores the document 30 into the expansion memory 50 (step 80), the control circuit 12 determines whether to encrypt the document 30 according to a prior setting of the mobile phone 10 set by the user (step 82). If the document 30 does not need to be encrypted, then the control circuit 12 directly writes the data of the document 30 into the expansion memory 50 (step 94). Otherwise, the encryption module 14 first generates a crypto-key 32 according to an identity of the mobile phone 30, such as the serial number 34 or the IMEI 36 (step 84), and then utilizes the crypto-key 32 to encrypt the document 30 into a ciphered document 52 (step 86). Moreover, after the crypto-key 32 is generated, the control circuit 12 determines whether to store the crypto-key 32 according to the prior setting of the mobile phone 10 (step 88). If the crypto-key 32 needs to be stored, then the crypto-key 32 is stored in the main memory 26 (step 90). Otherwise, the mobile phone 10 continues the next step. The ciphered document 52 then is written into the expansion memory 50 (step 92), and then the procedure for storing data into the expansion memory 50 is terminated (step 96).

Without decryption, the information of the ciphered document 52 is not readable. When the user wets to bow the information included in the ciphered document 52, the ciphered document 52 must be decrypted into the document 30 by using the crypto-key 32. However, the crypto-key 32 is not stored In the expansion memory 50, so the ciphered document 52 stored in the expansion memory 50 cannot be easily decrypted or hacked while the expansion memory 50 is lost or stolen. Moreover, the crypto-key 32 is generated according to an identify of the mobile phone, such as the serial number 28 or the IMEI 36, so the crypto-key 32 cannot be hacked easily and the safety of the ciphered document 52 can be ensured.

Figure 4:
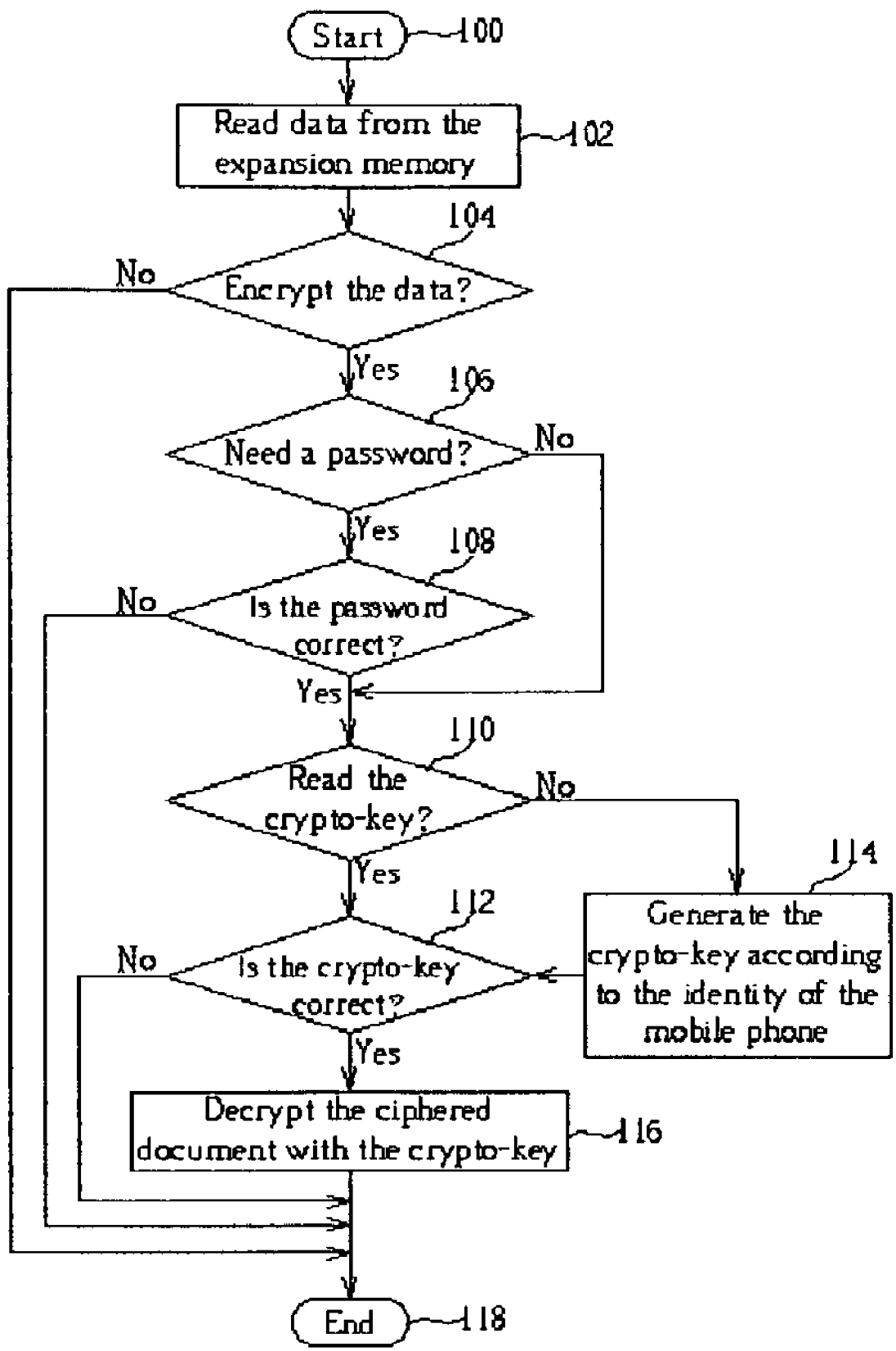
FIG. 4 is a flowchart of the mobile phone in FIG. 2 while reading data from the expansion memory in FIG. 2.

Please refer to FIG. 4, which is a flowchart of the mobile phone 10 while reading data from the expansion memory 50. When the mobile phone 10 reads the ciphered document 52 or other data from the expansion memory 50 (step 100 and 102), the control circuit 12 determines whether to decrypt the received data according to the prior setting of the mobile phone 10 (step 104). If the received data does not need to be decrypted, the control circuit 12 can directly use the received data without decryption, and then the procedure for reading data from the expansion memory 50 is terminated (step 118). However, if the received data needs to be decrypted, the control circuit 12 then determines whether a user needs to input a password 46 according to the prior setting of the mobile phone 10 (step 106). The password 46, thus, needs to be stored in the main memory 26 for comparison in advance if the user needs to input the password 46 in step 106. Therefore, any non-authorized user who wants to use the mobile phone 10 to read the ciphered document 52 and does not know the password 46 is restricted from accessing the ciphered document 52. So if the user needs to input the password 46 and the inputted password 46 is incorrect (step 106 and step 108), the procedure for reading data from the expansion memory 50 is terminated immediately (step 118). Otherwise, if the user does not need to input the password 46 or if the inputted password 46 is correct, then the control circuit 12 determines whether to read the crypto-key 32 from the main memory 26 according to the setting of the mobile phone 10 (step 110). If the reading of the crypto-key 32 from the main memory 26 is not required, the control circuit 12 uses the encryption module 14 to generate the crypto-key 32 according to the identity of the mobile phone 10, such as the serial number 28 or the IMEI 36 (step 114). Otherwise, the control circuit 12 reads the crypto-key 32 from the main memory 26. Then the control circuit 12 determines whether the crypto-key is correct and can be used to decrypt the ciphered document 52 according to the identity of the mobile phone 10 (step 112). If the crypto-key 32 is correct, the control circuit 12 controls the decryption module 16 to utilize the crypto-key 32 to decrypt the ciphered document 52 into the document 30. However, if the crypto-key 32 is incorrect, then the procedure for reading data from the expansion memory 50 is terminated (step 118) and any data received from the expansion memory 50 is eliminated from the main memory 26. Summarized, if the inputted password 46 or the identity of the mobile phone 10 is incorrect, the ciphered document 52 cannot be decrypted successfully into the document 52, and the ciphered document 52, thus, is under a proper protection from non-authorized users.

In contrast to the prior art, the present invention mobile phone restricts a crypto-key from being stored in an expansion memory to protect a ciphered document, so the ciphered document cannot be easily hacked when the expansion memory is stolen. Moreover, the crypto-key is generated according to an identity of the mobile phone, such as an IMEI, so the crypto-key cannot be generated without the correct identify of the mobile phone and the ciphered document, thus, cannot be decrypted successfully by any non-authorized user.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A mobile phone comprising:
   a control circuit for controlling operations of the mobile phone;
   an encryption module for encrypting data;
   a decryption module for decrypting data;
   an antenna electrically connected to the control circuit for receiving and generating radio signals;
   a microphone electrically connected to the control circuit for converting input voices into voice signals and transmitting the voice signals to the control circuit so that the control circuit controls the antenna to generate corresponding radio signals according to the voice signals;
   a speaker electrically connected to the control circuit for receiving voice signals from the control circuit and converting the received voice signals into output voices;
   a main memory electrically connected to the control circuit for storing data and a password of the mobile phone; and
   a memory connector electrically connected to the control circuit for connecting an expansion memory;
   wherein when the expansion memory connects to the memory connector to store a document received from the mobile phone, the control circuit compares a password entered by a user of the mobile phone with the password stored in the main memory, and after the control circuit determines that the entered password matches the password stored in the main memory, the encryption module generates a crypto-key according to an identity of the mobile phone and encrypts the document into a ciphered document by utilizing the crypto-key, and then the ciphered document is stored in the expansion memory and the crypto-key is restricted from being stored in the expansion memory.

2. The mobile phone of claim 1 wherein the identity is a serial number of the mobile phone.

3. the mobile phone of claim 1 wherein the identity is an international mobile station equipment identity (IMEI) of a subscriber identity module (SIM) card of the mobile phone.

4. The mobile phone of claim 1 further comprising a display device electrically connected to the control circuit for displaying the document.

5. The mobile phone of claim 1 wherein the decryption module is capable of utilizing the crypto-key to decrypt the ciphered document into the document.

6. The mobile phone of claim 5 wherein before the ciphered document is decrypted into the document, the control circuit determines whether the crypto-key is capable of being used to decrypt the ciphered document.

7. The mobile phone of claim 5 wherein before the decryption module utilizes the crypto-key to decrypt the ciphered document into the document, the encryption module generates the crypto-key according to the identity of the mobile phone.

8. The mobile phone of claim 5 wherein the decryption module utilizes the crypto-key, which Is read from the main memory, to decrypt the ciphered document into the document.

* * * * *